April 20, 1948.  A. P. LOFQUIST, JR  2,440,178

HOSE COUPLING

Filed Sept. 8, 1945

Inventor
Albert P. Lofquist Jr.
By Lyon & Lyon
Attorneys

UNITED STATES PATENT OFFICE 2,440,178

HOSE COUPLING

Albert P. Lofquist, Jr., Inglewood, Calif.

Application September 8, 1945, Serial No. 615,121

14 Claims. (Cl. 285—86)

My invention relates to hose couplings, and among the objects of my invention are:

First, to provide a hose coupling which is particularly desirable for use in aircraft or in similar applications where dependability of the coupling is of primary importance.

Second, to provide a hose coupling which imparts a uniformly distributed radial pressure on the hose so that adequate but not excessive pressure may be applied to all parts of its periphery.

Third, to provide a hose coupling which incorporates novelly arranged substantially indepently acting arcuate shoes and a constricting cam which is not dependent on arcuate displacement of the shoes to effect clamping of the hose.

Fourth, to provide a hose coupling which may be arranged as an independent unit adapted to cooperate with a conventional nipple and hose, or may incorporate integrally the hose nipple.

With the above and other objects in view, reference is directed to the accompanying drawing, in which.

Figure 1:
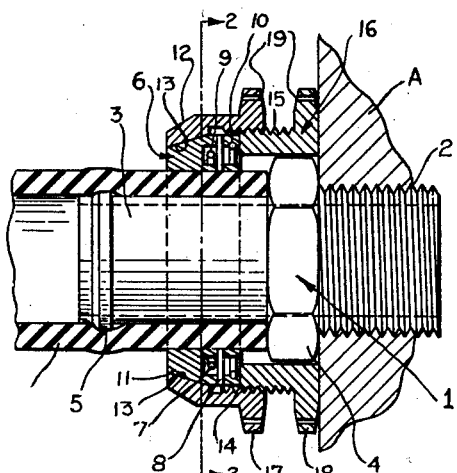
Figure 1 is a longitudinal sectional view of one form of my hose coupling with the hose nipple shown in elevation.
Figure 2:
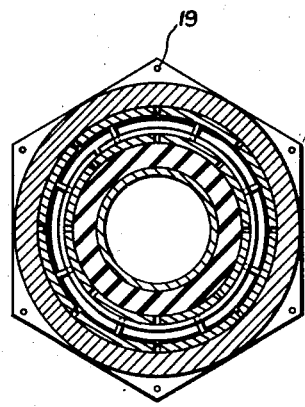
Figure 2 is a transverse sectional view thereof taken through 2—2 of Figure 1.

My hose coupling may be arranged as a removable assembly adapted to clamp the hose on a conventional nipple or other fitting, or my hose coupling may be integrally associated with the nipple. The first construction is shown in Figures 1 and 2. A conventional nipple 1 having a threaded portion 2 adapted to fit in a threaded opening provided in a wall A or other structure and provided with a tubular extended portion 3, is adapted to receive the end of a hose B. The nipple 1 may include a suitable tool-receiving portion 4 adjacent its threaded end and is preferably provided with a retainer rib 5 at the extended end of the tube 3 to aid in holding the end of the hose B thereon. The above described nipple is the type employed in aircraft; for example, it is used between a fuel tank and the fuel hose leading therefrom.

My hose coupling includes a plurality of clamping segments 6 which are loosely assembled into a ring. Each clamping segment is provided with an axial and accurately extending recess 7. The recesses of the several segments together define an annular axially directed channel. Each of the recesses is traversed by a radially extending pin 8. Between the pins of the several segments and the inner ends of the recesses 7 there is loosely positioned a retainer ring 9. By this means each of the clamping segments is capable of limited universal or independent movement relative to the other segments. Sufficient clearance is provided between the segments so that they can move radially outwardly and inwardly a sufficient distance to clear and to grip a hose. This movement is also permitted by reason of the fact that the radial width of the annular channel defined by the recesses 7 is appreciably greater than the thickness of the retaining ring 9.

It is desirable that the clamping ring defined by the clamping segments normally occupies an expanded position to facilitate insertion of the hose. This may be readily accomplished by an expansion ring 10 in the form of a wire looped within the channel defined by the axial recesses 7 and bearing outwardly against the outer walls of the recesses.

The outer surfaces of the clamping segments are beveled to form cam or wedge faces 11. The slope of the cam or wedge face of each segment preferably begins opposite the inner end of the axial recess and continues therefrom to the axial end of the segment opposite the end in which the recess is formed. The cam or wedge faces define an annular substantially frustoconical surface which is adapted to be engaged by a corresponding internal surface 13 of a cam ring 12. The cam ring is provided with internal threads 14 which engage external threads 15 of a thrust ring 16. The thrust ring has an internal diameter sufficient to clear the hose as well as the tool-receiving portion 4 of the nipple 1. The threaded end of the thrust ring 16 extends within the cam ring 12 and bears against the clamping segments 6.

The camp ring 12 and thrust ring 16 are provided with external flanges 17 and 18 which may be hexagonal in form to receive wrenches. In addition, holes 19 may be provided in the two flanges so that once they are tightened, locking wires may be inserted therethrough and tied.

Operation of the hose coupling is as follows:

The hose coupling may be pre-assembled with the clamping segments located within the cam ring and with the thrust ring partially screwed into the cam ring, or, if desired, the assembled clamping segments may be positioned on the hose and the cam, and thrust rings slipped thereon and threaded together. In either case, the cam and thrust rings coact as they are screwthreaded together to constrict the clamping segments 6 about the hose. By reason of the fact that each clamping segment is loosely supported, it fully adjusts itself to the surface of the hose and to the cam face 13 of the cam ring. Also, by reason of the loose relationship of the cam segments, there is no cumulative torsional load applied around the hose. Thus, all portions of the hose engaged by the clamping segments are forced radially inward.

Figure 3:
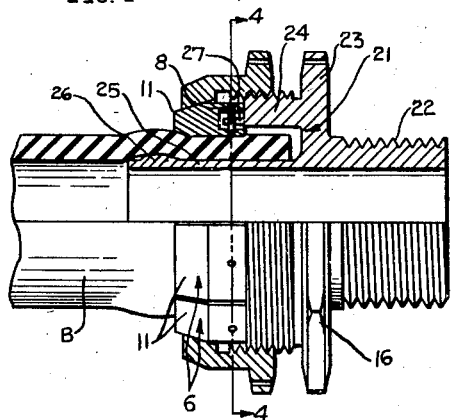
Figure 3 is a partial longitudinal sectional, partial elevational view of a modified form of my hose coupling.
Figure 4:
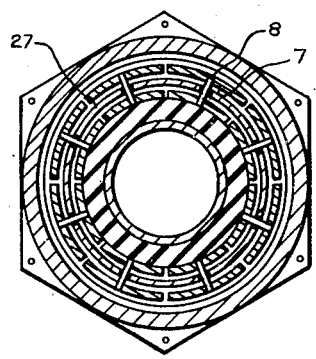
Figure 4 is a transverse sectional view thereof taken through 4—4 of Figure 3.

Reference is now made to the construction shown in Figs. 3 and 4. The clamping segments are essentially identical to the clamping segments shown in Figs. 1 and 2, and are similarly designated. This is also true of the cam ring 12. In place of the nipple 1 an integral nipple and thrust ring structure 21 is employed. This structure includes an externally threaded end 22 and flange 23 from which extends an annular skirt 24 projected in the direction opposite from the threaded end 22. The externally threaded skirt 24 corresponds to the thrust ring 16 and receives the cam ring 12.

Continuing from the threaded end 22 within the skirt 24 is a tube 25 having an annular retaining rib 26 at its extended end.

The clamping segment assembly may be identical to that shown in Fig. 1, or in place of the retainer ring 9 an annular lip 27 may extend from the skirt 24. The lip 27 is radially perforated to receive loosely the traversing pins 8 so that the several clamping segments 6 are thus loosely supported from the skirt 24. The expansion ring 10 may or may not be employed, as desired.

It should be pointed out that the lip 27 may be incorporated with the thrust ring 6, that is, may be employed in my form of hose coupling which is not integral with the nipple structure.

The operation of the construction shown in Figs. 3 and 4 is essentially the same as that shown in Figs. 1 and 2. The threaded end 22 may be designed to connect into a wall of a tank, or may be threaded for connection into a mating socket, and such a socket may form the end of a companion hose coupling so that two lengths of hose may be joined by use of my hose coupling on the confronting ends of the hose.

Figure 5:
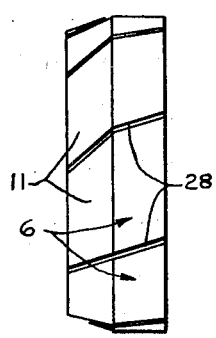
Figure 5 is an elevational view of the segmental ring structure showing a modified form of the clamping segments.

The clamping segments may be divided by axially directed planes, or as shown in Fig. 5, their confronting faces may define helices as indicated by 28, so that the points of contact of the segments circumferentially overlap.

Figure 6:
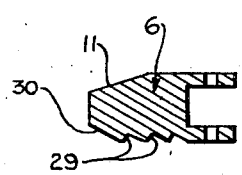
Figure 6 is an enlarged sectional view of one of the clamping segments illustrating that gripping teeth may be provided.

The inner surfaces of the clamping segments may be smooth, or may be provided with rudimentary serrations 29, as shown in Fig. 6.

It should also be pointed out that the hose receiving ends of the segments may be beveled as indicated by 30. The location of the retainer rib, such as retainer rib 26 in Fig. 3, may be beveled and located so that the beveled portions of the rib and the beveled portions 30 coact to clamp the hose tightly against the rib.

Many other embodiments of the invention may be resorted to without departing from the spirit of the invention.

I claim:

1. A hose coupling comprising: a thrust ring, and a cam ring, the latter having a tapered cam face; a plurality of clamping segments radially engaged by said cam ring and axially engaged by said thrust ring; said clamping segments defining compositely an annular axially directed channel; an annular retaining ring loosely fitting said channel; and radial pins for loosely retaining said segments on said ring in substantially equally spaced relation.

2. A hose coupling comprising: a nipple adapted to receive the end of a hose; a thrust ring and a cam ring adapted to fit over the end of the hose, said cam ring having a tapered cam face; a plurality of clamping segments circumferentially engaged by said cam ring and axially engaged by said thrust ring to constrict about said hose; said clamping segments defining compositely an annular axially directed channel; an annular retaining ring loosely fitting said channel; and radial pins for loosely retaining said segments on said ring in substantially equally spaced relation.

3. A hose coupling comprising: a threaded thrust ring; a threaded cam ring adapted to screw thereon, said cam ring having an internal tapered cam face; a plurality of clamp segments within said cam ring for radial thrust by said cam face and axial thrust by said thrust ring; circumferential axially directed loosely interfitting tongue and channel means incorporating said segments and said thrust ring; and radially directed connecting elements for individually connecting said clamp elements to said thrust ring thereby to define a contractible annulus, said tongue and channel means permitting limited radial and circumferential and twisting movement of the individual segments.

4. A hose coupling comprising: a nipple adapted to receive the end of a hose; a threaded thrust ring; a threaded cam ring adapted to screw thereon, said cam ring having an internal tapered cam face; a plurality of clamp segments within said cam ring for radial thrust by said cam face and axial thrust by said thrust ring said segments having axially directed recesses confronting said thrust ring, said thrust ring having annular mounting means extending axially into said recesses; and means for loosely retaining the clamping segments in equally spaced relation on said mounting means whereby said segments form a contractible ring, said means permitting limited radial and circumferential and twisting movement of the individual segments, said rings and clamps segments fitting over said hose and said cam segments adapted to be forced radially against said hose upon screwthreading said rings together.

5. A construction as set forth in claim 4 wherein yieldable means are provided for urging said clamp segments radially outwardly against the cam ring to facilitate insertion of said hose.

6. A hose coupling comprising: a thrust ring, and a cam ring, the latter having a tapered cam face; a hose engaging contractible ring radially engaged by said cam ring and axially engaged by said thrust ring, said contractible ring including a plurality of individual clamping segments each having an axially directed circumferentially extending recess defining compositively an annular channel; a retainer ring loosely fitting said channel; and radially directed pins for loosely and individually securing said segments thereon to form compositely a contractible annulus.

7. A hose coupling comprising: a threaded thrust ring; a threaded cam ring adapted to screw thereon, said cam ring having an internal tapered cam face; a hose clamping ring within said cam ring and defining a mating cam face and an axially directed channel facing said thrust ring, said clamping ring including a plurality of individual arcuate segments; a retainer ring loosely fitting in said channel; and connecting elements for loosely retaining said segments in substantially equally spaced relation around said retainer ring.

8. A hose coupling comprising: a threaded thrust ring; a threaded cam ring adapted to screw thereon, said cam ring having an internal tapered cam face; a hose engaging contractible ring radially engaged by said cam ring and axially engaged by said thrust ring, said contractible ring including a plurality of individual clamping segments each having an axial and circumferentially extending recess defining an annular channel; a pin traversing the recess of each segment; and a retaining ring receiving said pins to loosely retain said segments in their relative positions.

9. A hose coupling comprising: a nipple adapted to fit within a hose; an overlying ring integral with said nipple and defining therewith an annular axially directed space adapted to receive the end of the hose; a cam ring movable axially on said overlying ring, said cam ring having an internal cam face; individual clamping segments surrounding the hose within said cam ring, said segments being radially engageable by said cam ring and axially engageable by said overlying ring to clamp upon said hose; axially telescoping tongue and groove means incorporating said segments compositely; and radially directed pivot means penetrating said tongue and groove means to loosely secure said segments in ring form.

10. A hose coupling comprising: a nipple adapted to fit within a hose; an overlying ring integral with said nipple and defining therewith an annular axially directed space adapted to receive the end of the hose; a cam ring movable axially on said overlying ring, said cam ring having an internal cam face; individual clamping segments surrounding the hose within said cam ring, said segments being radially engageable by said cam ring and axially engageable by said overlying ring to clamp upon said hose; said clamping segments having axially and circumferentially directed recesses together defining an annular channel; a retaining ring loosely fitting said channel to permit individual radial movement of said segments; and means for restricting said segments against relative circumferential movement on said retainer ring.

11. A hose coupling comprising: a thrust ring; a plurality of clamping segments axially confronting said thrust ring; loose fitting axially telescoping means incorporating the confronting portions of said thrust ring and said clamping segments and permitting limited radial displacement of said clamping segments; means for individually restraining clamping segments against circumferential displacement relative to said thrust ring; and a constricting ring fitting over said clamping segments and engageable therewith to move said clamping segments radially.

12. A hose coupling comprising: an annulus divided helically into a plurality of clamping segments; a retainer ring, said annulus and retainer ring axially telescoping; connecting means between the individual segments of said annulus and said retainer ring to restrict said segments against relative circumferential movement but permit individual radial movement thereof; and means encircling said annulus to effect constriction thereof.

13. A hose coupling comprising: a retainer ring; a plurality of clamping segments; means for individually attaching said segments to said retainer ring for limited independent radial and pivotal movement but restraining said segments against relative circumferential movement; and means for constricting said segments including a thrust ring axially confronting said segments and a cam ring encircling said segments.

14. A hose coupling comprising: a retainer ring; a plurality of clamping segments; means for individually attaching said segments to said retainer ring for limited independent radial and pivotal movement but restraining said segments against relative circumferential movement; and yieldable means urging said segments to their radially expanded position.

ALBERT P. LOFQUIST, Jr.

REFERENCES CITED

The following references are of record in the file of this patent:

UNITED STATES PATENTS

| Number | Name | Date |
|---|---|---|
| 725,837 | Gmeiner | Apr. 21, 1903 |
| 2,205,347 | Darling | June 18, 1940 |

FOREIGN PATENTS

| Number | Country | Date |
|---|---|---|
| 280,991 | Germany | Apr. 19, 1914 |
| 564,619 | France | Oct. 24, 1923 |
| 431,918 | Great Britain | July 17, 1935 |